United States Patent [19]

Hamasaki

[11] Patent Number: 4,807,112
[45] Date of Patent: Feb. 21, 1989

[54] MICROCOMPUTER WITH A BUS ACCESSIBLE FROM AN EXTERNAL APPARATUS

[75] Inventor: Keiji Hamasaki, Tokyo, Japan

[73] Assignee: NEC Corporation, Tokyo, Japan

[21] Appl. No.: 786,519

[22] Filed: Oct. 11, 1985

[30] Foreign Application Priority Data

Oct. 11, 1984 [JP] Japan .................... 59-212851

[51] Int. Cl.$^4$ .................... G06F 13/28; G06F 9/00
[52] U.S. Cl. .................... 364/200; 364/900
[58] Field of Search ... 364/200 MS File, 900 MS File

[56] References Cited

U.S. PATENT DOCUMENTS

| | | | |
|---|---|---|---|
| 4,371,926 | 2/1983 | Yamaura et al. | 364/200 |
| 4,458,313 | 7/1984 | Suzuki et al. | 364/200 |
| 4,479,179 | 10/1984 | Dinwiddie, Jr. | 364/200 |
| 4,481,578 | 11/1984 | Hughes et al. | 364/200 |
| 4,528,626 | 7/1985 | Dean et al. | 364/200 |

Primary Examiner—Thomas M. Heckler
Assistant Examiner—Christina M. Eakman
Attorney, Agent, or Firm—Foley & Lardner, Schwartz, Mack, Blumenthal & Evans

[57] ABSTRACT

A microcomputer provided with a direct memory access (DMA) controller comprises a central processing unit (CPU), which includes a CPU timing controller, an address computation section, and an address bus output buffer coupled between the output of the address computation section and an external address bus. The CPU also includes an auxiliary timing controller operative, in response to a hold request from a DMA controller, to output a HOLD acknowledge (HOLDA) signal to the DMA controller and to reset a BUS ENABLE signal to the address bus output buffer, so tha the CPU is isolated from the external address bus. The CPU further includes an address latch circuit connected between the output of the address computation section and the address bus output buffer to temporarily hold the address output in response to a latch signal from the auxiliary timing controller, so that the address output is supplied to the address bus immediately when the latch signal is reset at the termination of the DMA operation.

3 Claims, 3 Drawing Sheets

MICROCOMPUTER WITH A BUS ACCESSIBLE FROM AN EXTERNAL APPARATUS

BACKGROUND OF THE INVENTION

1. Field of the Invention

The present invention relates to a microcomputer coupled to an external bus accessible from an external apparatus, and more particularly, to such a microcomputer adapted to be put in a wait condition when the right of using the external bus of the microcomputer is temporarily assigned to the external apparatus that has requested access to another external apparatus coupled to the external bus, without intermediary of the microcomputer.

2. Description of related art

At present, various types of microcomputers have been widely used. Most of microcomputers are of the stored program control type, and therefore, the processing speed is essentially defined by the speed at which the programs are executed by a central processing unit (CPU) contained in the microcomputers. On the other hand, these microcomputers are frequently used in combination with external apparatuses such as input/output devices, peripheral controllers, external memories, and others. Among these external apparatuses which are coupled with the microcomputers by an external bus, there are not only high speed devices but also low speed devices. Data transfer speed between two different apparatuses is determined by the slower device. Therefore, when a substantial amount of data is transferred between the microcomputer and an external apparatus which is typified by mass storages such as minidrums, floppy disks and magnetic disks, the data transfer speed is limited by the processing speed of the external apparatus. This is a waste of time to the microcomputer itself, because the microcomputer is inoperative during the data transfer.

In order to resolve this problem, a direct access of an external apparatus is performed without the intermediary of the microcomputer, so that the data transfer between the external apparatuses can be effected regardless of the microcomputer's operation.

This method is generally called a "direct memory access" (DMA). In this case, a microcomputer is coupled with an external memory via an external bus, and a direct memory access controller is coupled to the external bus together with an external apparatus, so as to request an external bus access to the microcomputer when the DMA data transfer is requested. Briefly, when a data transfer is requested from an input/output (I/O) interface, the DMA controller applies a HOLD command to the microcomputer. In response to the HOLD command, the microcomputer outputs a HOLD acknowledge (HOLDA) signal to the DMA controller and enters a HOLD state isolated from the external bus with regard to data transmission. Thus, the DMA controller obtains the right of controlling the external bus, and then, causes the external memory to couple with the external bus, so that the data transfer is effected between the external memory and the I/O interface without intermediary of the microcomputer. In other words, the microcomputer is placed in a HOLD state with regard to bus access, and the bus control right is assigned from the microcomputer to the DMA controller.

In this HOLD condition, the microcomputer continues to execute its operation (which does not need the access to the external bus), and when the operation needs access to the external bus the microcomputer actually enters the true or full HOLD state not only as to bus access but in respect to all operations.

After the DMA operation is completed, the DMA controller operates to separate the data transmission relation between the external memory and the I/O interface, and to reset the HOLD signal to the microcomputer. As a result, the microcomputer is released from the HOLD state and obtains the external bus control right. At the same time, the microcomputer resets the HOLDA signal, and starts the program operation. Specifically, since the microcomputer holds or stops operations when it needed access of the external bus, the microcomputer must first execute the address computation for an external apparatus to which the access is requested, after the external bus access right has been obtained. This will take an additional period of time corresponding to two or more clock cycles from the moment the HOLD command is reset. This additional time causes lowering of processing speed of the microcomputer, and is not negligible in modern microcomputers in which the DMA is frequently requested.

SUMMARY OF THE INVENTION

Accordingly, it is one object of the present invention to provide a microcomputer capable of obtaining the bus control right immediately after the completion of each DMA operation.

Another object of the present invention is to provide a microcomputer capable of accessing an external apparatus immediately after the completion of each DMA operation.

The above and other objects of the present invention are achieved by a microcomputer in accordance with the present invention which includes a central processing unit (CPU) coupled to an external bus. The microcomputer also includes means responsive to a direct memory access (DMA) request from an external apparatus, to cause the CPU to be isolated from the external bus and also to permit the external apparatus to access the external bus. The CPU comprises an address producing means for producing at least one address to access an external apparatus when the CPU is decoupled from the external bus, and an address holding means for temporarily holding the produced address until the DMA operation is completed. The CPU stops its operation except for the address producing operation and the address holding operation when the DMA operation is performed.

With the above arrangement of the microcomputer, the CPU is put in a HOLD state from the point of an external view, but is actually put in a WAIT condition in which the address producing means and the address holding means are activated when the DMA operation is performed. Thus, when the DMA operation is completed, the CPU can immediately access an external apparatus (e.g., an external memory) on the bases of the address output which has been maintained in the address holding means.

In one embodiment of the microcomputer, the CPU includes an address computation section and a latch circuit to hold the address output from the address computation section, so that the address output is immediately supplied to the address bus through an I/O interface such as an address but output buffer when the DMA operation is terminated. The address but output buffer is coupled to receive the output of the address computation section through the latch circuit and to supply the address output to the address bus. In addition, the CPU contains an auxiliary timing controller which is operative, in response to a HOLD request signal from the external apparatus such as a DMA controller, to output a HOLD acknowledge (HOLDA) signal to the DMA controller after completion of the instruction cycle being executed at the moment the HOLD request signal is received. This auxiliary timing controller also operates to reset a BUS ENABLE signal to the address bus output buffer when it outputs the HOLDA signal, so that the CPU is isolated from the external address bus with regard to data transmission.

Further, the CPU includes a CPU timing controller having a control input connected to an output of an AND gate, and the auxiliary timing controller operates to output a WAIT signal through the AND gate to the CPU timing controller when it generates the HOLDA signal. The CPU also includes an external bus use request detector for detecting whether the CPU requests access to the external bus and to put the AND gate in a passable condition when the external bus access is actually requested by the CPU. Thus, after the CPU is isolated from the external bus, the CPU continues to execute its operation under the control of the CPU timing controller until the CPU requests access to the external bus. Thereafter, the CPU is actually put in a wait state.

The above and other objects, features and advantages of the present invention will be apparent from the following description of preferred embodiments of the invention with reference to the accompanying drawings.

DESCRIPTION OF THE PREFERRED EMBODIMENTS

Figure 1:
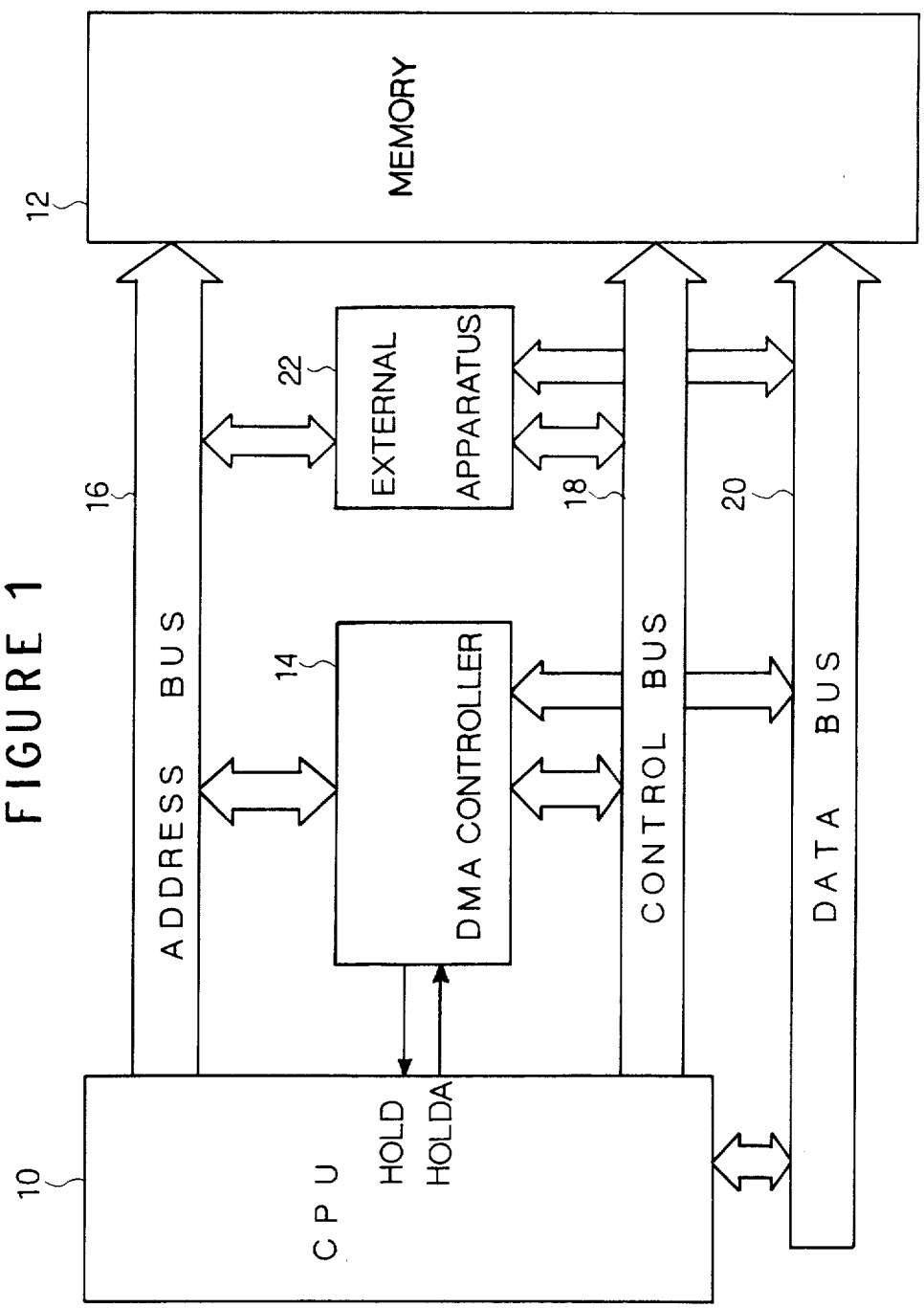
FIG. 1 is a block diagram showing a fundamental structure of a microcomputer and a direct memory access controller.

Referring to FIG. 1, the typical microcomputer having a direct memory access (DMA) function comprises a microprocessor or central processing unit (CPU) 10, which is coupled to an external memory 12 via an external bus including address, control and data buses 16, 18 and 20 respectively. The CPU 10 is controlled by a direct memory access (DMA) controller 14 also coupled to the external buses 16, 18 and 20.

Figure 2:
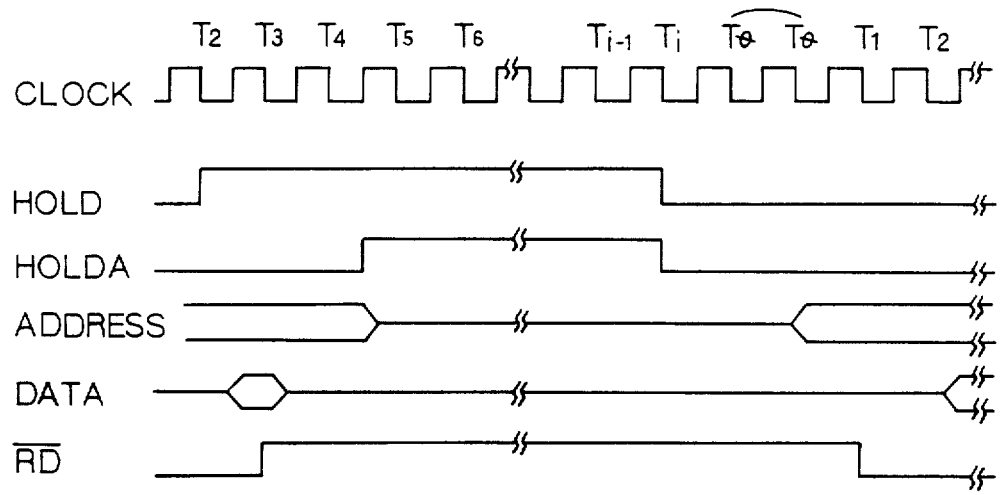
FIG. 2 is a set of timing diagrams illustrating the operation of the conventional microprocessor when the direct memory access operation is started and terminated.

In the case of the conventional microcomputer, when an external apparatus 22 such as a floppy disk is coupled to the external buses 16, 18 and 20 and requests the DMA operation to the DMA controller 14, the DMA controller 14 generates a HOLD command signal to the CPU 10, as shown in FIG. 2. In response to the HOLD command, the CPU 10 maintains the address bus in an active condition as shown in FIG. 2 until the clock cycle T5, i.e., the completion of the instruction cycle being executed at the moment the HOLD command signal is received. Thereafter, the CPU 10 outputs a HOLDA (hold acknowledge) signal to the DMA controller 14 at the clock cycle T5. At the same time, the CPU 10 the HOLD state with regard to data access by placing its outputs connected to the address and control buses 16 and 18 into a high impedance condition, so that the CPU 10 is isolated from these buses with regard to data transfer.

With receipt of the HOLDA signal, on the other hand, the DMA controller 14 knows that it obtained the bus control right from the CPU 10, and then, causes the external apparatus 22 to couple with the memory 12 via the buses 16, 18 and 20, so that the data transfer is effected between the external apparatus 22 and the memory 12 without intermediary of the CPU 10.

While the CPU 10 is isolated from the external bus, the CPU 10 continues to execute the operation that does not need enters access to the true or full external bus. When the CPU 10 needs the external bus access, the CPU 10 then becomes the HOLD state not only with regard to bus access but as to all operations.

When the DMA operation is completed at the clock cycle Ti, the DMA controller 14 operates to disconnect the data transfer relation between the external apparatus 22 and the memory 12, and to reset the HOLD signal to the CPU, so that the CPU 10 is released from the HOLD condition, and obtains the external bus control right. At the same time, the CPU resets the HOLDA signal, and starts program operation. Specifically, in the conventional microcomputer, the CPU reads the content in the program memory when the CPU is actually released from the HOLD state, and performs the address computation so as to obtain the real or absolute address from the logical address, in the clock cycles $T_O$ and $T_O$ as shown in FIG. 2 prior to actual memory access for the program operation. As mentioned above, this additional time period is not negligible in modern microcomputers in which the DMA is frequently requested.

Figure 3:
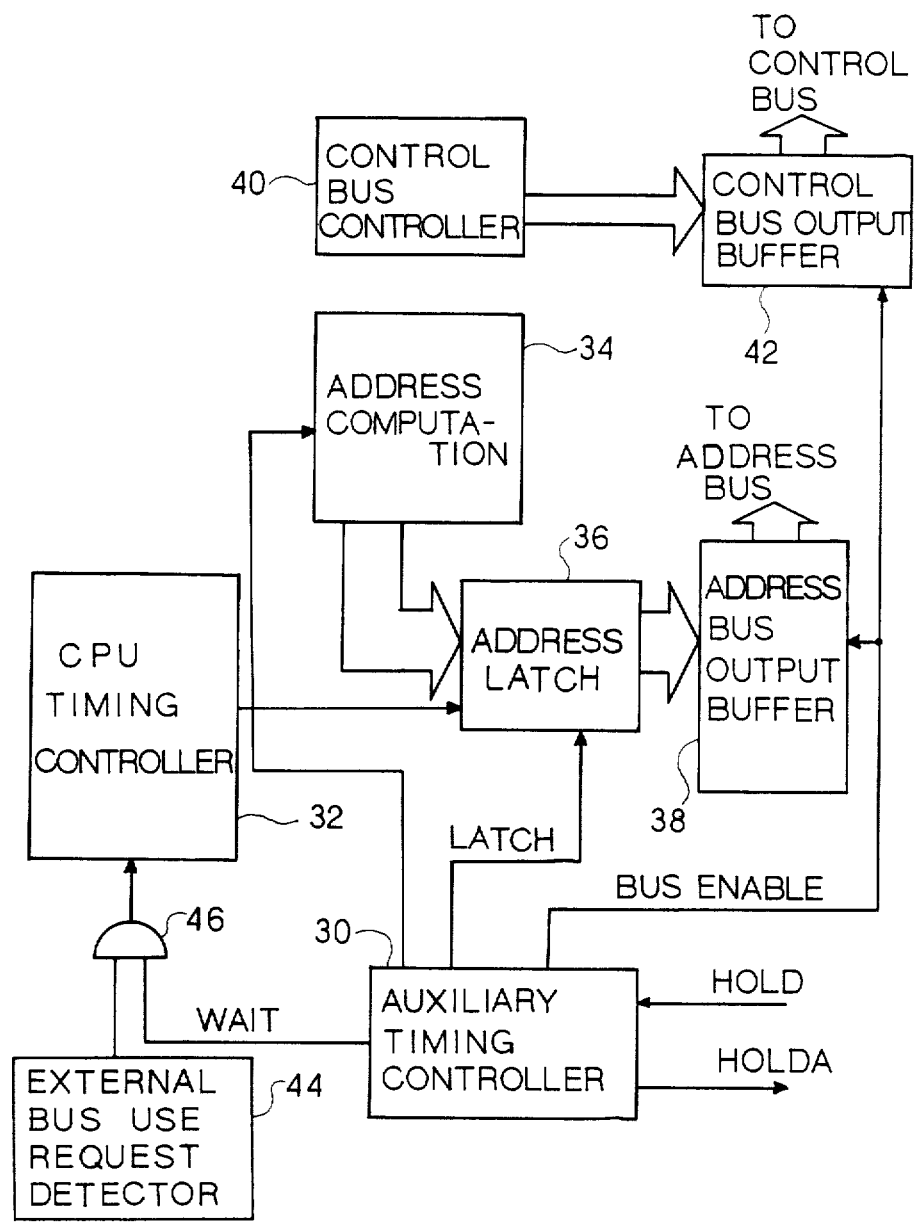
FIG. 3 is a block diagram showing the construction of the timing control section and the output buffer section in the CPU of a microcomputer in accordance with the present invention.

Turning to FIG. 3, there is shown a block diagram of the timing control section and the output buffer section in the CPU 10 of the microcomputer constructed in accordance with the present invention. The CPU 10 shown in FIG. 3 includes an auxiliary timing controller 30 adapted to receive the HOLD command signal from the DMA controller 14 shown in FIG. 1 and to output the HOLDA signal to the DMA controller 14. This auxiliary timing controller 30 also outputs a WAIT signal through an AND gate 46 to control input of a CPU timing controller 32, which operates to control the timing of the operation of the CPU. The CPU further includes an address computation section 34 which functions to convert the logical address in an associated program memory (not shown) to an absolute or real address and to output the real address to a latch circuit 36, which is controlled by the auxiliary timing controller 30 and the CPU timing controller 32.

This latch circuit 36 has an output connected to an address bus output buffer 38 which is adapted to be coupled to the address bus. Further, the CPU shown includes a control bus controller 40 connected to a control bus output buffer 42, which is adapted to be coupled to the control bus. These bus output buffers 38 and 42 are controlled by a BUS ENABLE signal from the auxiliary timing controller 30.

Further, there is provided an external bus use request detector 44 adapted to monitor whether the CPU requests the access to the external bus and to put the AND gate 46 in a non-passable condition until the external bus access is actually requested by the CPU, so that the WAIT signal is blocked by the AND gate 46. In other words, the detector 44 makes the AND gate 46 passable after the external bus access request of the CPU, in which event the WAIT signal is applied to the CPU timing controller 32 so as to actually put the CPU in a WAIT condition.

Figure 4:
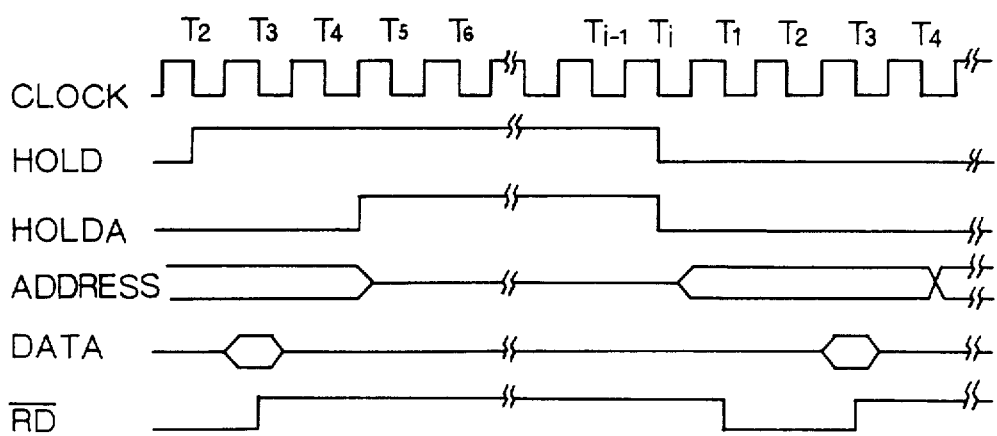
FIG. 4 is similar to FIG. 2 but shows the case of the microcomputer in accordance with the present invention.

In the microcomputer having the CPU provided with the auxiliary timing controller 30 and the latch circuit 36 as shown in FIG. 3, when the DMA operation is requested, the DMA controller 14 supplies the HOLD command signal to the auxiliary timing controller 30. But, the auxiliary timing controller 30 then operates to maintain the BUS ENABLE signal to the two bus output buffers 38 and 42, so that the instruction cycle being executed at the moment the HOLD command signal is received will be completely carried out. Thereafter, the auxiliary timing controller 30 generates the HOLDA signal at the clock cycle $T_5$ as shown in FIG. 4, and at the same time resets the BUS ENABLE signal so that the bus output buffers 38 and 42 are brought into a high impedance condition. As a result, the CPU 10 is apparently isolated from the address and control buses 16 and 18 with regard to the data transfer, but continues its operation which does not need access to the external bus.

In response to the HOLDA signal which means that the internal bus control right is assigned to the DMA controller 14 from the CPU 10, the DMA controller 14 permits the external apparatus 22 to access the memory 12 via the external buses 16, 18 and 20 but without intermediary of the CPU 10.

Simultaneously, the auxiliary timing controller 30 outputs the LATCH signal to the address latch circuit 36 so that the latch circuit 36 can hold the address outputted from the address computation section 34.

In addition, the auxiliary timing controller 30 also supplies the WAIT signal to the AND gate. However, unless the operation executed by the CPU 10 does not request the external bus access, since the AND gate 46 is maintained non-passable, the WAIT signal is blocked, so as to ensure that the CPU continues its operation. In the course of the CPU operation in the condition isolated from the external bus, when the CPU requests bus access, such request is detected by the detector 44, which then makes the AND gate 46 passable. Accordingly, the WAIT signal is actually applied to the CPU timing controller 32, so that the CPU is placed in a wait state. But, the logical address of the CPU program operation that needs the external bus access is converted by the address computation section 34 to the real address, which is held in the latch circuit 36 by the LATCH signal from the auxiliary timing controller 30. In other words, while the CPU assigns the bus control right to the DMA controller, there has been beforehand carried out and maintained the address computation for the memory access cycle which should be executed when the CPU gets the bus control right.

When the DMA processing is terminated at the clock cycle Ti, the DMA controller 30 resets the HOLD signal to the auxiliary timing controller 30, as shown in FIG. 4. In response to the reset of the HOLD signal, the auxiliary timing controller 30 resets the WAIT signal and the LATCH signal, and sets the BUS ENABLE signal. Therefore, the real address latched in the latch circuit 36 is outputted through the address bus output buffer 38 to the address bus 16, so that the CPU 10 accesses the memory 12 at the clock cycle $T_1$ as shown in FIG. 4. Namely, the CPU 20 can access the memory 12 without requiring the clock cycles $T_O$ and $T_O$ as shown in FIG. 2. In other words, the bus control right is rapidly shifted from the DMA controller to the CPU after the completion of the DMA operation. The operations following the bus access are executed similarly to these of the conventional microcomputer.

As seen from the above explanation and also from comparison between FIGS. 2 and 4, the microcomputer in accordance with the present invention can quickly start the memory access operation, after the completion of the DMA operation, without the additional time corresponding to the clock cycles $T_O$ and $T_O$ required for the address computation for the memory access.

In the above mentioned embodiment, the DMA controller is provided to the microcomputer as an external apparatus, but can alternately be incorporated as an internal device of the microcomputer.

The invention has thus been shown and described with reference to the specific embodiments. However, it should be noted that the invention is in no way limited to the details of the illustrated structures but changes and modifications may be made within the scope of the appended claims.

I claim:

1. A microcomputer which includes a central processing unit (CPU) and an external memory which are coupled to an external bus, and a direct memory access (DMA) controller operative in response to a DMA request from an external apparatus to cause the CPU to be isolated from the external bus and also to permit the external apparatus to access the external memory via the external bus, the CPU including at least a CPU timing controller, an address computation section and an address but output buffer coupled to receive an output of an address bus of the external bus, comprising:

an address latch circuit connected between the output of the address computation and the address bus output buffer to temporarily hold the address output from the address computation section so that the address output can be supplied to the address bus output buffer immediately after a DMA operation is terminated;

an auxiliary timing controller operative, in response to a hold request from the DMA controller, to output a HOLD acknowledge signal to the DMA controller and to reset a BUS ENABLE signal to the address bus output buffer, so that the CPU is isolated from the address bus of the external bus, the auxiliary timing controller also operating to output a WAIT signal through an AND gat to the CPU timing controller when it generates the HOLD acknowledge signal; and a detector monitoring CPU requests to access the external bus, and operating to maintain the AND gate in a closed condition to prevent the WAIT signal from being inputted to the CPU timing controller until the CPU actually requests an external bus access so that the CPU continues operation and the address computation section can compute a real address for a next instruction in the condition isolated from the address bus of the external bus, and to put the AND gate in a passable condition when the CPU actually requests an external bus access in the course of the CPU operation in the condition isolated from the address but of the external bus, whereby the CPU is maintained in an operating condition until the external bus access is requested by the CPU, and the address temporarily held in the address latch circuit is outputted to the external bus through the address bus output buffer immediately after the CPU is released from the WAIT condition.

2. A microcomputer comprising:

(a) an address bus output buffer having an address input, an address bus output connected to a an address bus and a bus enable input, said address bus output buffer responsive to a bus enable signal at said bus enable input for connecting said address bus output to said address bus, and responsive to a resetting of said bus enable signal to isolate said address bus output buffer from said address bus;

(b) a control bus output buffer having a control input, a control output connected to a control bus and a bus enable input, said control bus output buffer responsive to said bus enable signal at said bus enable input for connecting said bus control output to said control bus and responsive to a resetting of said bus enable signal for isolating said control bus output buffer from said control bus;

(c) an address latch for storing an address, said address latch having an address input, and output connected to said address input of said address bus output buffer and a latch input;

(d) an address computation unit operative for computing a real address of an external device from a stored logical address, said address computation unit having an output connected to said address input of said address latch;

(e) a CPU timing controller operative for controlling the timing of operation of a CPU, said CPU timing controller having an input and being operative in response to a wait signal at said input for halting operation of said CPU;

(f) an external bus use request detector operative for detecting a bus request by said CPU of said microcomputer and outputting a bus request signal in response thereto;

(g) a logic circuit having an output connected to said CPU timing controller for supplying said wait signal thereto and an input connected to receive said signal from said external bus use request detector;

(h) an auxiliary timing controller having an input connected to receive a HOLD signal from a DMA controller and providing a HOLD acknowledge signal to said DMA controller, said auxiliary timing controller further having:

(1) a bus enable output connected to the bus enable inputs of both said control bus output buffer and said address bus output buffer, said bus enable output providing said bus enable signal, (2) a latch output connected to the latch input of said address latch, said latch output providing a latch signal for latching the contents of said address latch, and (3) a wait output connected to another input of said logic circuit, said auxiliary timing controller generating said wait signal with said HOLD acknowledge signal;

(i) said logic circuit including means for blocking generation of said wait signal on said logic circuit output, and thereby preventing feeding of said wait signal to said input of said CPU timing controller, only in response to said bus request signal from said external bus use request detector;

(j) said auxiliary timing controller operative for resetting said bus enable signal upon generating said HOLD acknowledge signal thereby isolating both said control bus output buffer from said control bus and said address bus output buffer from said address bus, and operative for generating said latch signal for latching the real address of said address computation unit into said address latch; and (k) said auxiliary timing controller further operative upon resetting of said HOLD acknowledge signal for:

(1) resetting said wait signal, thereby permitting resumption of CPU operations, (2) resetting said latch signal to permit said real address stored in said buffer address latch to be input to said address bus output buffer and (3) generating said bus enable signal thereby permitting said real address from said address latch to be fed to said address bus and enabling connection of said control bus output buffer to said control bus.

3. A microcomputer which includes a central processing unit (CPU), a memory and an address bus for coupling the CPU to the memory, so that the CPU accesses the memory by outputting an address data to the address bus, wherein the CPU includes:

address computation means for computing and outputting the address data, an output buffer coupled to receive the computed address data from the address computation means for outputting the received address data to the address bus, a first timing controller for generating an operation timing clock signal for the CPU, a second timing controller responding to a hold request from a DMA controller so as to generate a latch signal and a wait signal and to disable the output buffer so that the CPU is isolated from the address bus, latch means coupled between the address computation means and the output buffer and responding to the latch signal to latch the address data from the address computation means, and means receiving the wait signal so as to supply the wait signal to the first timing controller for causing the first timing controller to stop the generation of the operation timing clock signal so that the CPU is brought into a wait condition, the second timing controller operating to reset the wait signal and to enable the output buffer when the hold request is withdrawn, so that the first timing controller starts the generation of the operation timing clock signal again and the address data stored in the latch means is outputted through the output buffer to the address bus, thereby to allow the CPU to access the memory.

* * * * *